United States Patent
Wang et al.

(10) Patent No.: US 7,283,560 B1
(45) Date of Patent: Oct. 16, 2007

(54) METHOD AND APPARATUS FOR ADDRESS TRANSLATION BETWEEN FIBRE CHANNEL ADDRESSES AND SCSI ADDRESSES

(75) Inventors: Wei-Gung Wang, Cupertino, CA (US); David Lee, San Jose, CA (US)

(73) Assignee: Vicom Systems, Inc., Redwood City, CA (US)

( * ) Notice: Subject to any disclaimer, the term of this patent is extended or adjusted under 35 U.S.C. 154(b) by 977 days.

(21) Appl. No.: 10/215,368

(22) Filed: Aug. 8, 2002

(51) Int. Cl.
*H04J 3/16* (2006.01)
(52) U.S. Cl. ................. 370/466; 709/129; 711/202
(58) Field of Classification Search .............. None
See application file for complete search history.

(56) References Cited

U.S. PATENT DOCUMENTS

| | | | |
|---|---|---|---|
| 5,941,972 A | 8/1999 | Hoese et al. ............... 710/129 |
| 6,041,381 A | 3/2000 | Hoese .................. 710/129 |
| 6,138,161 A | 10/2000 | Reynolds et al. ........... 709/227 |
| 6,148,414 A | 11/2000 | Brown et al. ............... 714/9 |
| 6,421,753 B1 * | 7/2002 | Hoese et al. ............... 710/315 |
| 6,675,253 B1 * | 1/2004 | Brinkmann et al. ........ 710/316 |
| 6,963,982 B1 * | 11/2005 | Brustoloni et al. ......... 726/15 |
| 2001/0052061 A1 * | 12/2001 | Fradette .................... 711/202 |

* cited by examiner

*Primary Examiner*—Chi Pham
*Assistant Examiner*—Tran Phuc
(74) *Attorney, Agent, or Firm*—Campbell Stephenson LLP; Samuel G. Campbell, III

(57) ABSTRACT

A method of address translation is disclosed. The method includes performing a translation between a first storage unit address mapping and a second storage unit address mapping.

18 Claims, 6 Drawing Sheets

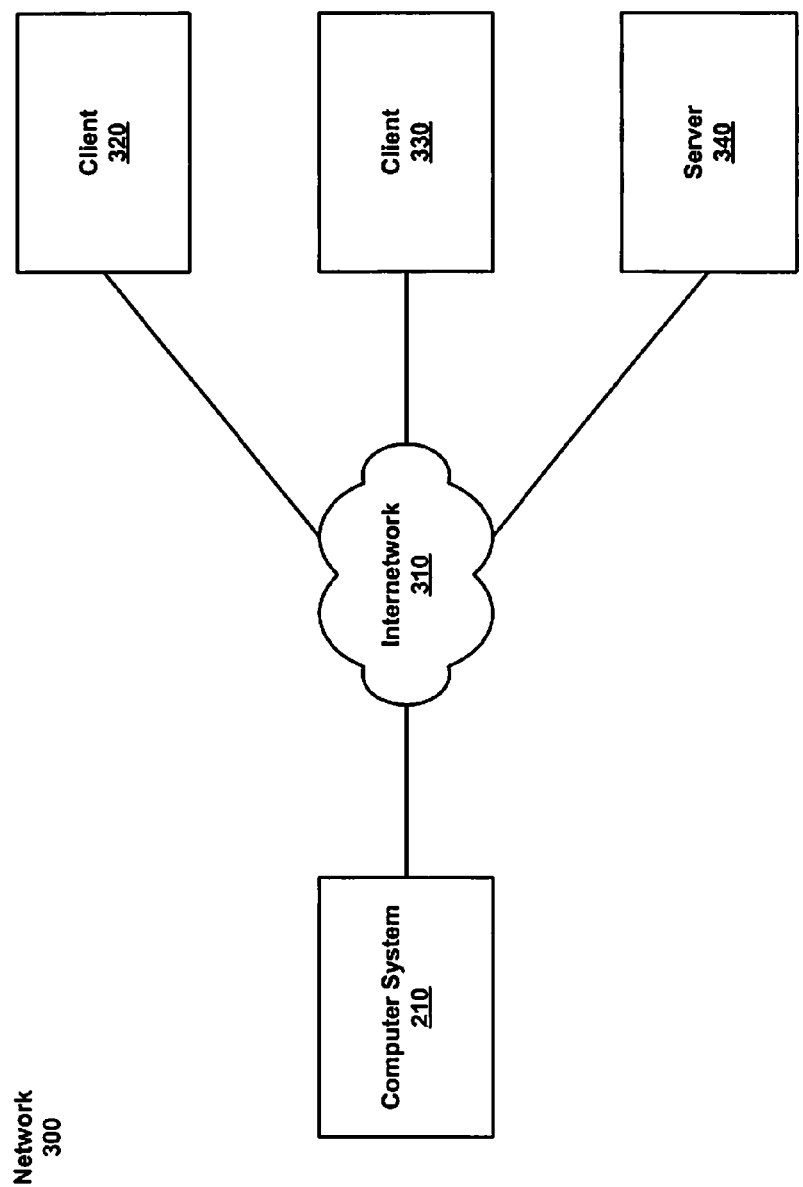

METHOD AND APPARATUS FOR ADDRESS TRANSLATION BETWEEN FIBRE CHANNEL ADDRESSES AND SCSI ADDRESSES

BACKGROUND OF THE INVENTION

1. Field of the Art

The present invention relates to the field of storage area networks, and more specifically to a method and apparatus for passing data input/output (I/O) operations between host computers and storage subsystems, using Fibre Channel and Small Computer System Interface (SCSI) interfaces.

2. Description of the Related Art

In many data processing centers, it is common for data to be stored on storage units such as permanent storage drives, each of which is part of a large infrastructure of storage arrays or subsystems. Individual hosts, part of banks of such computers, located within the premises, or situated remotely, can be interconnected in complicated arrangements to utilize that storage, often via a storage area network (SAN). Interstitial devices, a storage router being an important example, can form the nodes of such a network, and play an important intermediary role in the communicative coupling between such elements.

For a host, an individual storage drive member is address-referenced by its logical unit number (LUN), which is generally the deepest level field of a multi-faceted address description, otherwise referred to as a hardware path. Other number fields comprising this description can include target, bus, port, area, protocol, adapter and bus-converter designations. Different hosts will have different requirements which will determine a hardware path description that is complete.

Configuration schemes can be established defining particular relationships amongst particular storage drives or between them and the individual hosts which must access them. Various forms of drive redundancy may be implemented, or perhaps other patterns of alliance, otherwise referred to as zoning, where elements of shared storage are made private to certain host members, for example.

Processes of this kind, involve customization of the drive address mappings, with redefinition of LUNs being a fundamental aspect of such processes. Typically, the redefinition of LUNs can be arranged through a user interface that provides the functionality necessary for the components which, in turn, provide a platform for management of the entire SAN and its attached elements. Ideally, this management platform is SAN-centric, and can be found in the storage routers, although such a management platform can alternatively reside as an integral part of the storage media, or within one or more of the hosts. However, it is often desirable to support legacy systems using newer technology, including the protocols associated with each (e.g., including the addressing schemes used therein). Unfortunately, such protocols are not always compatible, and these incompatibilities need to be addressed in order to allow for such support.

SUMMARY OF THE INVENTION

The present invention provides methods and apparati that address such needs, which can reside on storage area network (SAN) router hardware, or form part of the instructions contained in one, or several, modules of software resident on one, or more, host computers, which are attached to a SAN, connecting them to storage arrays/subsystems, or be provided in some other manner, including custom hardware (e.g., one or more ASICs). A method and apparatus according to embodiments of the present invention act intrinsically, providing a scheme of address translation (e.g., from the address mapping of the SCSI protocol to the address mapping of the fibre channel protocol).

In one embodiment of the present invention, a method of address translation is disclosed. The method includes performing a translation between a first storage unit address mapping and a second storage unit address mapping.

In another embodiment of the present invention, a storage area router is disclosed. The storage area router includes an address translator. The address translator is configured to translate between a first storage unit address mapping and a second storage unit address mapping.

The foregoing is a summary and thus contains, by necessity, simplifications, generalizations and omissions of detail; consequently, those skilled in the art will appreciate that the summary is illustrative only and is not intended to be in any way limiting. Different nomenclature, however, shall not adversely affect the level of protection afforded by the patent which is to apply to this invention, defined as it is by the processes, means and modes of operation described hereafter.

As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawing.

FIG. 3 is a block diagram illustrating the interconnection of the computer system of FIG. 2 to client and host systems.

The use of the same reference symbols in different drawings indicates similar or identical items.

DETAILED DESCRIPTION OF THE DRAWINGS

Figure 1A:
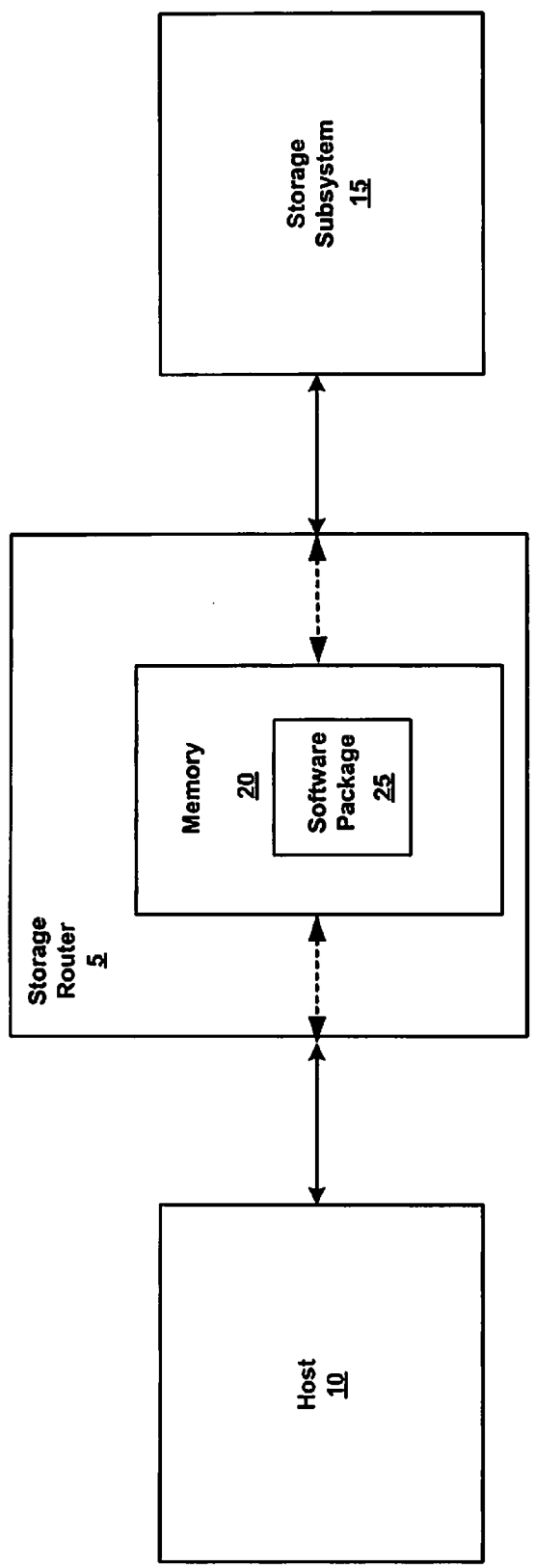
FIG. 1A is a block diagram illustrating an apparatus capable of performing address translation according to embodiments of the present invention.

The following is intended to provide a detailed description of an example of the invention and should not be taken to be limiting of the invention itself. Rather, any number of variations may fall within the scope of the invention which is defined in the claims following the description.

Introduction

In SAN arrangements incorporating storage units (e.g., fibre channel drives), certain types of hosts consistently experience problems relating to drive recognition. Analysis of experimental observations has shown that certain LUN numbering patterns established with storage virtualization configurations result in the host recognizing only some of the available drives, and ignoring the existence of others.

The inventors explained this phenomenon as being attributable to the manner of general implementation of the fibre channel (FC) protocol in certain hardware. In fact, with certain mass storage applications that are based on a legacy standard (e.g., the Small Computer Systems Interface (SCSI) transport layer protocol), the adoption of FC is largely derived from addressing structures and paradigms introduced with the SCSI protocol. In such applications, although maintenance of pre-existing protocol features is often advantageous, such retention also carries with it some incompatibilities with subsequent (e.g., FC) addressing schemes. With the latter having emerged as the transport layer protocol standard in SANs, often supplanting SCSI interconnections, resolution of the conflict is an important issue to be addressed.

The present invention describes a method and apparatus which support device address translation (e.g., of an FC-based mapping of SAN storage elements), enabling all storage units (e.g., hard drives, or more simply drives) to be recognized by hosts employing another protocol (e.g., the SCSI protocol). Addressing is the information that a host uses to establish a particular pipeline for the source or destination of its I/O operations. There are circumstances in which address mappings are manipulated for some purpose, and this can have adverse effects on the ability for a particular host to 'see' all of the drives which ought to be available to that host. There are, however, measures which can be taken to overcome such difficulties, and a method according to embodiments of the present invention performs a translation that resolves problems preventing certain hosts (those using SCSI interfaces) from successfully operating in an installation where such address mapping customizations are being applied.

Definitions

There is nomenclature associated with the components, whose function-specific roles need to be explained to promote understanding of the invention. These definitions are each just one interpretation, of which there may be several, and so should not be taken to be limiting.

LUN:
A logical unit number is the most fundamental field in a hardware path description. The LUN identifies the device within the logical address space of the system.

Target Number:
The number of the target device.

Bus Number:
The number of the bus over which the message travels.

Protocol Type:
The type of protocol (e.g., SCSI or FC).

Adapter Address:
The address of the host adapter.

Hardware Path:
The hardware path for fibre channel addressing has the following format:
[BCN]/[AAN].[PTN].[AN].[PN].[BN].[TN].[LUN]

where:
BCN >> decimal value representing a bus converter number—the highest order path component associated with a particular HBA;

AAN >> decimal value representing an adapter address number—the next order path component also associated with a particular HBA;

PTN >> decimal value representing a protocol type number—usually equal to 8 when designating mass storage equipment;

AN >> decimal value representing a area number—with zero designating a private loop FC-AL;

PN >> decimal value representing a port number—which can be allocated any one of a range of values as deemed appropriate;

BN >> decimal value representing a bus number—the first path component directly implicated in the algorithm according to the method of the present invention;

TN >> decimal value representing a target number—the second path component directly implicated in the algorithm according to the method of the present invention;

LUN >> decimal value representing a logical unit number—a fundamental component field of the hardware path, and a focus of the algorithm according to the method of the present invention.

The definition of other of the terms used herein will be apparent to one of skill in the art, and their definition is left to the discussions in which they are introduced.

An Apparatus for Performing Address Translation

FIG. 1A is a block diagram illustrating an apparatus capable of performing address translation according to embodiments of the present invention. As can be seen, a storage router 5 is coupled between a host 10 and a storage subsystem 15. Storage router 5 includes a memory 20. A software package 25 is stored in memory 20, and can, for example, execute therefrom, and the combination of which acts as an address translator. Software package 25 includes one or more modules that effect the functionality provided by embodiments of the present invention, a process according to which is described subsequently with regard to FIG. 1B.

It will be apparent to one of skill in the art that the following process can be implemented using hardware elements (e.g., accumulators, shifters, and the like), and such hardware may be employed in place of software package 25 in memory 20 to provide such functionality, and is also referred to herein as an address translator.

A Process of Address Translation According to the Present Invention

Figure 1B:
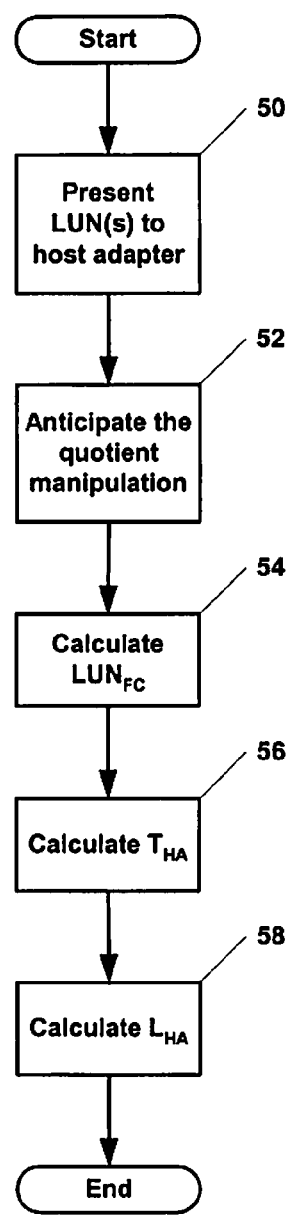
FIG. 1B is a flow diagram illustrating the actions performed in address translation according to an embodiment of the present invention.

FIG. 1B is a flow diagram illustrating the actions performed in address translation according to an embodiment of the present invention. The following is a description of a process according to embodiments of the present invention. An important point is that although designed to function within the framework of a SAN coupling a SCSI-based hosts with a SAN to which are also attached one or more FC-based storage units (e.g., storage drive arrays/subsystems), such an arrangement need not necessarily exist for this address translation algorithm, according to the method of the present invention, to be applicable and successfully be employed.

The storage router presents logical unit numbers (LUNs) to the host adapter (step 50) employing the SCSI protocol as a series of whole number multiples of 8. This is a conversion which has been determined to suit the manner of translation which the host adapter will manipulate and present to the user on the host as part of the hardware address path.

For example, for the case of eight devices in a FC loop, the LUNs are mapped by the storage router thus:

$$LUN_{FC}' = LUN_{FC} \times 8$$

and so are presented in the following order:
- $LUN_{FC}\ 0 \Rightarrow LUN_{FC}\ 0$;
- $LUN_{FC}\ 1 \Rightarrow LUN_{FC}\ 8$;
- $LUN_{FC}\ 2 \Rightarrow LUN_{FC}\ 16$;
- $LUN_{FC}\ 3 \Rightarrow LUN_{FC}\ 24$;
- $LUN_{FC}\ 4 \Rightarrow LUN_{FC}\ 32$;
- $LUN_{FC}\ 5 \Rightarrow LUN_{FC}\ 40$;
- $LUN_{FC}\ 6 \Rightarrow LUN_{FC}\ 48$; and
- $LUN_{FC}\ 7 \Rightarrow LUN_{FC}\ 56$.

This conversion anticipates the quotient manipulation which takes place at the host adapter for the host (step 52), satisfying the following equation and conditions (steps 54, 56 and 58):

i) $LUN_{FC}' = (T_{HA} \times 8) + (B_{HA} \times 8 \times 16)$
ii) $T_{HA} : 0 \leq T_{HA} \leq 15$
iii) $L_{HA} = 0$ where:
$LUN_{FC}'$=storage router mapped FC logical unit number;
$T_{HA}$=target number (necessarily an integer value);
$B_{HA}$=bus number (necessarily an integer value);
$L_{HA}$=logical unit number (e.g., zero).

Notably, the LUN value presented to the host is preferably zero, because this averts the possibility of any unrecognized targets from the problem related to recognizing FC LUNs out of sequential order.

Figure 1C:
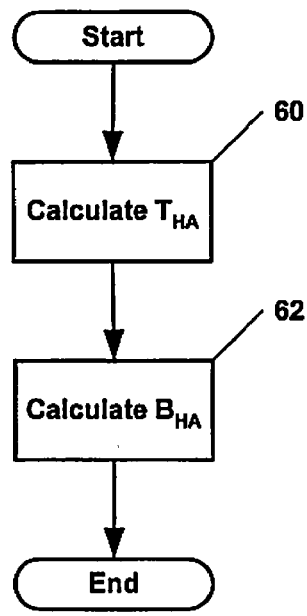
FIG. 1C is a flow diagram illustrating the actions performed in address translation according to an embodiment of the present invention.

FIG. 1C is another flow diagram illustrating the actions performed in address translation according to an embodiment of the present invention. This is in anticipation of the quotient manipulation which is performed by the host adapter to determine the fields of the hardware path to the storage units. These are therefore derived uniquely, by a reversal process, with the following integer long division (steps 60 and 62):

$$T_{HA} \Rightarrow (LUN_{FC}' \text{ div } 8) \bmod 16;$$

and $$B_{HA} \Rightarrow ((LUN_{FC}' \text{ div } 8) \text{ div } 16) \bmod 16.$$

Preferably, one potential issue of a legacy system's characteristics (e.g., SCSI characteristics) is that the value of FC LUNs is limited to less than 256, and this is reflected by the limited extent structure of the conversion process. If this limitation were to be dropped by the host, then a process according to the present invention could correspondingly be extended by a further integer long division step, involving another hardware path field. The occurrence of such a scenario and the manner of allowing for such a scenario, as an extension to process according to the present invention, would be understood by those of skill in the art. It will also be noted by those of skill in the art that such operations can be implemented by shifting the bits that make up the given addresses and results.

As noted, a process according to one embodiment of the present invention is described above. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Operational Scenario Embodying Method of the Invention

A specific operational scenario is presented here, as a way of describing the different process facets of the invention, all of which are essential components of successfully implementing the method of address translation from FC to SCSI.

The subsequent description details the arithmetic manipulations of each of the LUNs, which is the basis of the algorithm. Code specific detail of these is omitted, instead substituted by a functional outline illustrating, in a simplified manner, the steps taking place.

As will be apparent to one of skill in the art, the operations disclosed herein may be implemented in a number of ways, and such changes and modifications may be made without departing from this invention and its broader aspects. Another embodiment of the same method may encompass similar steps, though not necessarily in the same order, and is not limiting of what other/extra supplementary steps may also happen or need to be initiated. Other aspects, inventive features, and advantages of the present invention, as defined solely by the claims, will become apparent in the non-limiting description set forth below.

To give an arbitrary example of the manner in which a target is mapped, and its LUN presented to the host user, consider the $65^{th}$ FC LUN:

As presented to the host adapter, by the storage router, the LUN mapping is thus:

$LUN_{FC}65 \Rightarrow LUN_{FC}'520$;

Manipulation by the host adapter to determine the fields of the hardware path which are therefore derived uniquely as:

$$T_{HA} => (LUN'_{FC} \text{div } 8) \text{mod } 16$$
$$= (65) \text{mod } 16$$
$$= 1$$

and $$B_{HA} => ((LUN'_{FC} \text{div } 8) \text{div } 16) \text{mod } 16$$
$$= (4) \text{mod } 16$$
$$= 4$$

Hence, the last three fields of the hardware path of the form:

$B_{HA} . T_{HA} . L_{HA}$ are represented as:

4 0.1 0.0

An Example Computing and Network Environment

Figure 1D:
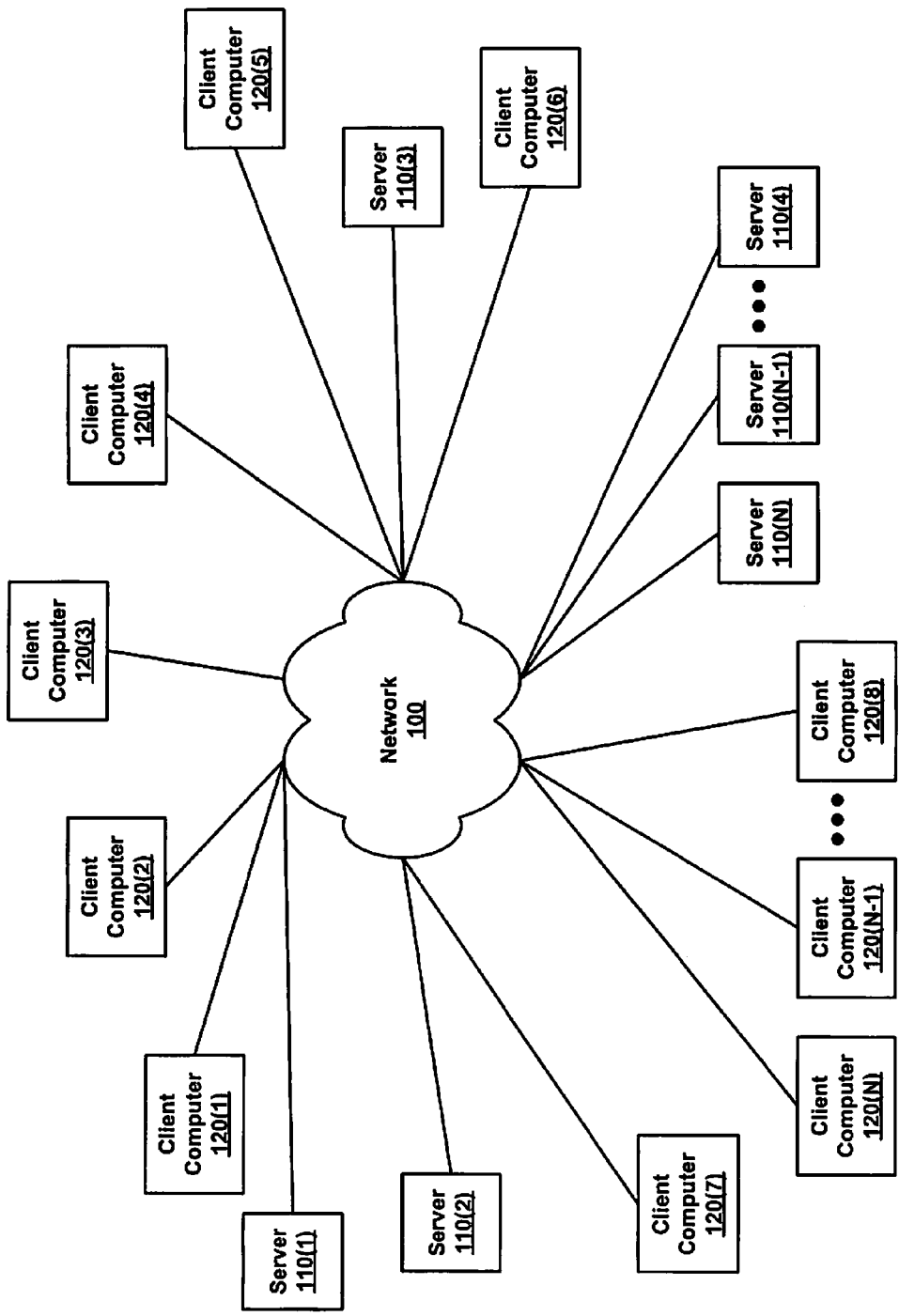
FIG. 1D is a block diagram illustrating a network environment in which commercial transaction processing according to embodiments of the present invention may be practiced.

FIG. 1D is a block diagram illustrating a network environment in which a method according to the present invention may be practiced. As is illustrated in FIG. 1D, network 100, such as a private wide area network (WAN) or the Internet, includes a number of networked servers 110(1)-(N) that are accessible by client computers 120(1)-(N). Communication between client computers 120(1)-(N) and servers 110(1)-(N) typically occurs over a publicly accessible network, such as a public switched telephone network (PSTN), a DSL connection, a cable modem connection or large bandwidth trunks (e.g., communications channels providing T1 or OC3 service). Client computers 120(1)-(N) access servers 110(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 120(1)-(N).

One or more of client computers 120(1)-(N) and/or one or more of servers 110(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 120(1)-(N) is shown in detail in FIG. 2.

It will be noted that the variable identifier "N" is used in several instances in FIG. 1D to more simply designate the final element (e.g., servers 110(1)-(N) and client computers 120(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 2:
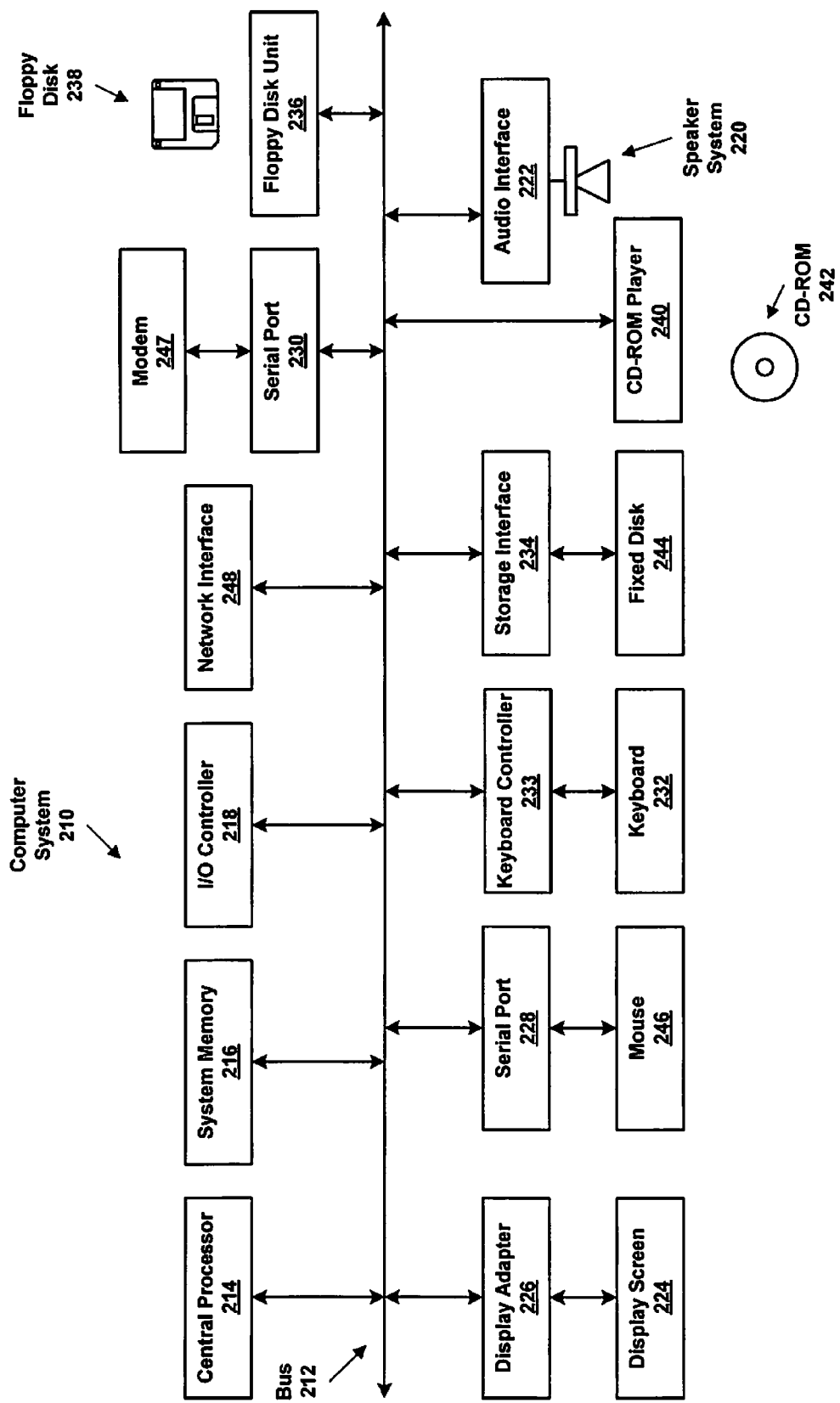
FIG. 2 is a block diagram illustrating a computer system suitable for implementing embodiments of the present invention.

FIG. 2 depicts a block diagram of a computer system 210 suitable for implementing the present invention, and example of one or more of client computers 120(1)-(N). Computer system 210 includes a bus 212 which interconnects major subsystems of computer system 210 such as a central processor 214, a system memory 216 (typically RAM, but which may also include ROM, flash RAM, or the like), an input/output controller 218, an external audio device such as a speaker system 220 via an audio output interface 222, an external device such as a display screen 224 via display adapter 226, serial ports 228 and 230, a keyboard 232 (interfaced with a keyboard controller 233), a storage interface 234, a floppy disk drive 236 operative to receive a floppy disk 238, and a CD-ROM drive 240 operative to receive a CD-ROM 242. Also included are a mouse 246 (or other point-and-click device, coupled to bus 212 via serial port 228), a modem 247 (coupled to bus 212 via serial port 230) and a network interface 248 (coupled directly to bus 212).

Bus 212 allows data communication between central processor 214 and system memory 216, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., CD-ROM drive 240), floppy disk unit 236 or other storage medium. Additionally, applications may be in the form of electronic signals modulated in accordance with the application and data communication technology when accessed via network modem 247 or interface 248.

Storage interface 234, as with the other storage interfaces of computer system 210, may connect to a standard computer readable medium for storage and/or retrieval of information, such as a fixed disk drive 244. Fixed disk drive 244 may be a part of computer system 210 or may be separate and accessed through other interface systems. Many other devices can be connected such as a mouse 246 connected to bus 212 via serial port 228, a modem 247 connected to bus 212 via serial port 230 and a network interface 248 connected directly to bus 212. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 2 to be present to practice the present invention. The devices and subsystems may be interconnected in different ways from that shown in FIG. 2. The operation of a computer system such as that shown in FIG. 2 is readily known in the art and is not discussed in detail in this application. Code to implement the present invention may be stored in computer-readable storage media such as one or more of system memory 216, fixed disk 244, CD-ROM 242, or floppy disk 238. Additionally, computer system 210 may be any kind of computing device, and so includes personal data assistants (PDAs), network appliance, X-window terminal or other such computing device. The operating system provided on computer system 210 may be MS-DOS®, MS-WINDOWS®, OS/2®, UNIX®, Linux® or other known operating system. Computer system 210 also supports a number of Internet access tools, including, for example, an HTTP-compliant web browser having a JavaScript interpreter, such as Netscape Navigator® 3.0, Microsoft Explorer® 3.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 210). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

FIG. 3 is a block diagram depicting a network 300 in which computer system 210 is coupled to an internetwork 310, which is coupled, in turn, to client systems 320 and 330, as well as a server 340. Internetwork 310 (e.g., the Internet) is also capable of coupling client systems 320 and 330, and server 340 to one another. With reference to computer system 210, modem 247, network interface 248 or some other method can be used to provide connectivity from computer system 210 to internetwork 310. Computer system 210, client system 320 and client system 330 are able to access information on server 340 using, for example, a web browser (not shown). Such a web browser allows computer system 210, as well as client systems 320 and 330, to access data on server 340 representing the pages of a website hosted on server 340. Protocols for exchanging data via the Internet are well known to those skilled in the art. Although FIG. 3 depicts the use of the Internet for exchanging data, the present invention is not limited to the Internet or any particular network-based environment.

Referring to FIGS. 1D, 2 and 3, a browser running on computer system 210 employs a TCP/IP connection to pass a request to server 340, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A storage area router comprising:
   an address translator, wherein
      said address translator is configured to translate between a first storage unit address mapping and a second storage unit address mapping,
      said first storage unit address mapping is a drive address mapping of a SCSI protocol,
      said second storage unit address mapping is a drive address mapping of a fibre channel protocol,
      said translator is further configured to translate from said SCSI protocol to said fibre channel protocol,
      said translator is further configured to perform a calculation that satisfies $LUN_{FC}'=(T_{HA}\times 8)+(B_{HA}\times 8\times 16)$ and $0 \leq T_{HA} \leq (B-1)$, $LUN_{FC}'$=FC logical unit number,
      $T_{HA}$=target number, and
      $B_{HA}$=bus number.

2. The storage area router of claim 1, wherein said translator is further configured to:
   perform said calculation while also satisfying $L_{HA}=0$, wherein
      $L_{HA}$=logical unit number.

3. The storage area router of claim 1, wherein said translator is further configured to translate from said fibre channel protocol to said SCSI protocol.

4. The storage area router of claim 3, wherein said translator is further configured to:
   perform a calculation that satisfies $T_{HA}=(LUN_{FC}'$ div $8)$mod $16$, and $B_{HA}=((LUN_{FC}'$ div $8)$div $16)$mod $16$, wherein
      $LUN_{FC}'$=FC logical unit number,
      $T_{HA}$=target number, and
      $B_{HA}$=bus number.

5. A method of address translation comprising:
   performing a translation between a first storage unit address mapping and a second storage unit address mapping, wherein
      said first storage unit address mapping is a drive address mapping of a SCSI protocol,
      said second storage unit address mapping is a drive address mapping of a fibre channel protocol,
      said translation is from said SCSI protocol to said fibre channel protocol and comprises satisfying $LUN_{FC}'=(T_{HA}\times 8)+(B_{HA}\times 8\times 16)$, and $0 \leq T_{HA} \leq 15$, $LUN_{FC}'$=FC logical unit number,
      $T_{HA}$=target number, and
      $B_{HA}$=bus number.

6. The method of claim 5, wherein said translation further comprises:
   satisfying $L_{HA}=0$, wherein
      $L_{HA}$=logical unit number.

7. The method of claim 5, wherein said translation is from said fibre channel protocol to said SCSI protocol and comprises:
   satisfying $T_{HA}=(LUN_{FC}'$ div $8)$mod $16$, and $B_{HA}=((LUN_{FC}'$ div $8)$div $16)$mod $16$, wherein
      $LUN_{FC}'$FC logical unit number,
      $T_{HA}$=target number, and
      $B_{HA}$=bus number.

8. A computer system comprising:
   a processor;
   a first storage unit, coupled to said processor and having a first storage unit address in a first storage unit address mapping;
   a second storage unit, coupled to said processor and having a second storage unit address in a second storage unit address mapping;
   computer readable medium coupled to said processor; and
   computer code for address translation, encoded in said computer readable medium, configured to cause said processor to:
      perform a translation between said first storage unit address mapping and said second storage unit address mapping, wherein
         said first storage unit address mapping is a drive address mapping of a SCSI protocol,
         said second storage unit address mapping is a drive address mapping of a fibre channel protocol,
         said translation is from said SCSI protocol to said fibre channel protocol and comprises satisfying $LUN_{FC}'=(T_{HA}\times 8)+(B_{HA}\times 8\times 16)$, and $0 \leq T_{HA} \leq 15$, $LUN_{FC}'$=FC logical unit number,
$T_{HA}$=target number, and
$B_{HA}$=bus number.

9. The computer system of claim 8, wherein said calculations further satisfy $L_{HA}=0$, wherein
$L_{HA}$=logical unit number.

10. The computer system of claim 8, wherein said computer code configured to cause said processor to perform said translation is further configured to cause said processor to:
perform a translation from said fibre channel protocol to said SCSI protocol.

11. The computer system of claim 8, wherein said computer code configured to cause said processor to perform said translation from said fibre channel protocol to said SCSI protocol is further configured to cause said processor to:
perform said translation from said fibre channel protocol to said SCSI protocol by performing calculations satisfying:

$T_{HA}=(LUN_{FC}'$ div $8)$mod $16$, and $B_{HA}=((LUN_{FC}'$ div $8)$div $16)$mod $16$, wherein
$LUN_{FC}'$=FC logical unit number,
$T_{HA}$=target number, and
$B_{HA}$=bus number.

12. A computer readable storage medium encoded with a computer program for address translation, the computer program comprising:
a first set of instructions, configured to perform a translation between a first storage unit address mapping and a second storage unit address mapping, wherein said first storage unit address mapping is a drive address mapping of a SCSI protocol,
said second storage unit address mapping is a drive address mapping of a fibre channel protocol,
said first set of instructions are further configured to translate from said SCSI protocol to said fibre channel protocol and comprises satisfying $LUN_{FC}=(T_{HA}\times 8)+(B_{HA}\times 8\times 16)$, and $0 \leq T_{HA} \leq 15$, $LUN_{FC}$=FC logical unit number,
$T_{HA}$=target number, and $B_{HA}$=bus number.

13. The readable medium product of claim 12, wherein said first set of instructions further comprises:
a first sub-subset of instructions, executable on said computer system, configured to perform calculations satisfying:

$L_{HA}=0$,
wherein
$L_{HA}$=logical unit number.

14. The readable medium product of claim 12, wherein said first set of instructions further comprises:
a first subset of instructions, executable on said computer system, configured to perform a translation from said fibre channel protocol to said SCSI protocol.

15. The computer readable medium of claim 14, wherein said first subset of instructions comprises:
a first sub-subset of instructions, executable on said computer system, configured to perform calculations satisfying:

$T_{HA}=(LUN_{FC}'$ div $8)$mod $16$, and $B_{HA}=((LUN_{FC}'$ div $8)$div $16)$mod $16$, wherein
$LUN_{FC}'$=FC logical unit number,
$T_{HA}$=target number, and
$B_{HA}$=bus number.

16. An apparatus for address translation comprising:
means for performing a translation between a first storage unit address mapping and a second storage unit address mapping, wherein
said first storage unit address mapping is a drive address mapping of a SCSI protocol,
said second storage unit address mapping is a drive address mapping of a fibre channel protocol,
said translation means is configured to translate from said SCSI protocol to said fibre channel protocol and comprises means for calculating $LUN_{FC}'=(T_{HA}\times 8)+(B_{HA}\times 8\times 16)$, and $0 \leq T_{HA} \leq 15$, $LUN_{FC}'$=FC logical unit number,
$T_{HA}$=target number, and
$B_{HA}$=bus number.

17. The apparatus of claim 16, wherein said translation further comprises:
means for calculating $L_{HA}=0$, wherein
$L_{HA}$=logical unit number.

18. The apparatus of claim 16, wherein said translation means is further configured to translate from said fibre channel protocol to said SCSI protocol and comprises:
means for calculating $T_{HA}=(LUN_{FC}'$ div $8)$mod $16$, and $B_{HA}=((LUN_{FC}'$ div $8)$div $16)$mod $16$, wherein
$LUN_{FC}'$=FC logical unit number,
$T_{HA}$=target number, and
$B_{HA}$=bus number.

* * * * *